United States Patent [19]

Hitney

[11] Patent Number: 5,301,127
[45] Date of Patent: Apr. 5, 1994

[54] HIGH SPEED METHOD FOR PREDICTING RADIO-WAVE PROPAGATION
[75] Inventor: Herbert V. Hitney, San Diego, Calif.
[73] Assignee: The United States of America as represented by the Secretary of the Navy, Washington, D.C.
[21] Appl. No.: 834,916
[22] Filed: Feb. 12, 1992
[51] Int. Cl.[5] .......................... G02B 5/18; G02B 27/56
[52] U.S. Cl. .............................. 364/525; 364/DIG. 1; 356/354; 356/359; 356/361; 359/195; 324/95; 324/96; 455/40
[58] Field of Search .................. 342/26; 356/361, 359, 356/354, 353, 128, 129; 359/195, 559; 343/700 R; 364/300, DIG. 1; 455/40; 434/303; 324/95, 96

[56] References Cited

U.S. PATENT DOCUMENTS 4,125,893  11/1978  Hitney et al. ....................... 364/300

OTHER PUBLICATIONS

Shkarofdky et al., Computer Modeling of Multipath Propagation: Review of Ray-Tracing Techniques, Radio Science, vol. 17, No. 5, pp. 1133-1158, Sep.-Oct. 1982.
Dockery, Modeling Electromagnetic Wave Propagation in the Troposphere Using the Parabolic Equation, IEEE Transactions on Antennas & Propagation, vol. 36, No. 10, pp. 1464-1470, Oct. 1988.
Hitney et al., Tropospheric Radio Propagation Assessment, Proceedings of the IEEE, vol. 73, No. 2, pp. 265-283, Feb. 1985.
Ko, Harvey W. et al.; "Anomalous Microwave Propagation Through Atmospheric Ducts"; pp. 12-26; 1983; Laurel, MD.
"Propagation Modelling in the Troposhere: Parabolic Equation Method"; pp. 1136-1139; 1 Sep. 1988; United Kingdom.
Patterson, W. L. et al.; Engineer's Refractive Effects Prediction System (EREPS) Revision 2.0; Feb. 1990; San Diego, CA.
Ryan, F. J.; "RPE: A Parabolic Equation Radio Assessment Model"; 19-1-19-10; 15-19 May 1989; United Kingdom.
Craig, K. H. et al.; "A Forecasting System Using the Parabolic Equation-Application to Surface-to-Air Propagation in the Presence of Elevated Layers"; 20-1-20-13; 15-19 May 1989; United Kingdom.
Levy, M. F. et al.; "Assessment of Propagation Predictions Using Minisonde Refractivity Data and the Parabolic Equation Method"; 25-1-25-12; 15-19 May 1989; United Kingdom.
Craig, K. H. et al.; "Field Strength Forecasting with the Parabolic Equation: Wideband Applications"; pp. 461-465; 1989; United Kingdom.
Tappert, Fred D.; "The Parabolic Approximation Method"; Wave Propagation and Underwater Acoustics; Chapter V; 1977; New York, NY.

*Primary Examiner*—Jack B. Harvey
*Assistant Examiner*—Kamini Shah
*Attorney, Agent, or Firm*—Harvey Fendelman; Thomas G. Keough; Peter A. Lipovsky

[57] ABSTRACT

Radio-wave propagation is rapidly predicted by a hybrid computational method that uses Ray Optics techniques to calculate radio field strength above a limiting radio-wave ray, Parabolic Equation techniques to calculate radio field strength below the limiting radio-wave ray and below a predetermined altitude, and a newly created Extended Optics method to compute radio field strength in an area of the atmosphere below the limiting radio-wave ray and above the predetermined altitude. Rays in the extended optics area are initialized from the elevation angle that rays traced through the parabolic equation area make with the predetermined altitude. Where reflected, direct or origin created rays do not exist within the parabolic equation area, the elevation angle for the ray that does exist at the furthest range (optical limit) is used to initiate ray tracing in the extended optics area for ranges beyond the optical limit. Where the refractive index varies along the predetermined altitude, adjustments to the elevation angle used to initialize rays within the extended optics area are made. Propagation factors, determined through the Parabolic Equation method, are assigned to the rays traced through the extended optics area based upon the propagation factors in existence at the predetermined altitude. Field strength or propagation loss within the extended optics area is calculated from an interpolation between propagation factor values assigned to the extended optics rays.

15 Claims, 5 Drawing Sheets

FIG. 1

PRIOR ART

*FIG. 2*

PRIOR ART

HIGH SPEED METHOD FOR PREDICTING RADIO-WAVE PROPAGATION

STATEMENT OF GOVERNMENT INTEREST

The invention described herein may be manufactured and used by or for the Government of the United States of America for governmental purposes without the payment of any royalties thereon or therefor.

INCORPORATION BY REFERENCE

The article "Computer Modeling of Multipath Propagation: Review of Ray-Tracing Techniques" by I. P. Shkarofsky and S. B. Nickerson found in *Radio Science*, Vol. 17, No. 5, pp. 1133-1158, September-October 1982 is incorporated by reference herein in its entirety. Also incorporated herein is the article "Modeling Electromagnetic Wave Propagation in the Troposphere Using the Parabolic Equation" by G. Daniel Dockery found in *IEEE Transactions on Antennas and Propagation*, Vol. 36, No. 10, Ootober 1988. Also incorporated by reference herein is the article "Tropospheric Radio Propagation Assessment" by H. V. Hitney, J. H. Richter, R. A. Pappert, K. D. Anderson and G. B. Baumgartner, Jr. found in *Proceedings of the IEEE*, Vol. 73, No. 2, pp. 265-283, February 1985.

BACKGROUND OF THE INVENTION

1. Field of the Invention

The invention pertains to a method for predicting radio-wave propagation in the atmosphere. In particular, the invention relates to a hybrid method utilizing a number of different techniques to rapidly predict radio-wave propagation.

2. Description of the Related Art

Radio-waves propagating from a transmitter are controlled by the aggregate effects of the atmosphere's radio refractive index, which may vary in both the vertical and horizontal dimensions. The amplitude of a simple wave front depends upon the accumulated focusing and defocusing caused by the gradient of the refractive index normal to the direction of the wave front propagation at all points along the path of the wave. The phase of such a wave front depends upon the product of the refractive index present at a particular point in the atmosphere times a mathematically determined incremental pathway both of which are integrated over the total path the wave front travels.

The path that a wavefront takes in propagating through a medium is known as a ray. It depends upon the refractive index according to Snell's Law. If a transmitter lies near a reflecting surface, such as the earth, then the transmitted wave will be reflected from this surface. The reflection process modifies the amplitude and phase of the reflected wave based upon the local grazing angle of the wave with the surface, and the refractive indices of the two interfacing mediums. At any point away from a transmitter, the total radio field strength or intensity depends upon the coherent sum of all waves, direct and reflective, present at that point.

Ray Optics methods have long been used to compute radio field strength above a limiting radio wave ray. The limiting radio wave ray is the path of a transmitted radio wave that reflects from a surface at a small limiting angle, generally a fraction of one degree. In the ray optics region lying above the limiting ray, radio field strength is dominated by the interference of rays coming directly from a transmitter and rays reflecting from a reflecting surface. The effects of the refractive index along the direct and reflective wave paths are frequently ignored in this region, but they can be included as described by Hitney et al. in their report referred to above. Ray Optics methods, such as those described in the I. P. Shkarofsky and S. B. Nickerson article referenced above, are known to give good results for waves above the limiting wave ray, but have not been found usable below this limiting ray.

Split-step Parabolic Equation methods have been used to calculate radio field strength for nearly all ranges and altitudes for certain types of transmitters. Descriptions of split-step Parabolic Equation methods are given by G. D. Dockery referred to above. For practical considerations, however, there are limitations as to the maximum height that can be considered by these methods. Parabolic Equation methods depend upon forward and inverse Fast Fourier Transforms to construct range-step marching solutions to the parabolic wave equation, which can readily consider the effects of refractive-index variations in both the horizontal and vertical dimensions.

The vertical spacing between points to be transformed in the Fast Fourier Transforms depends upon frequency, transmitter height above a reflecting surface, and maximum elevation angle. Although no theoretical maximum height exists for the Parabolic Equation method, at microwave frequencies vertical spacing becomes so small that the number of points to be transformed becomes prohibitively large. Because of this, Parabolic Equation methods are typically limited to heights of 1,000 to 2,000 meters.

Figure 1:
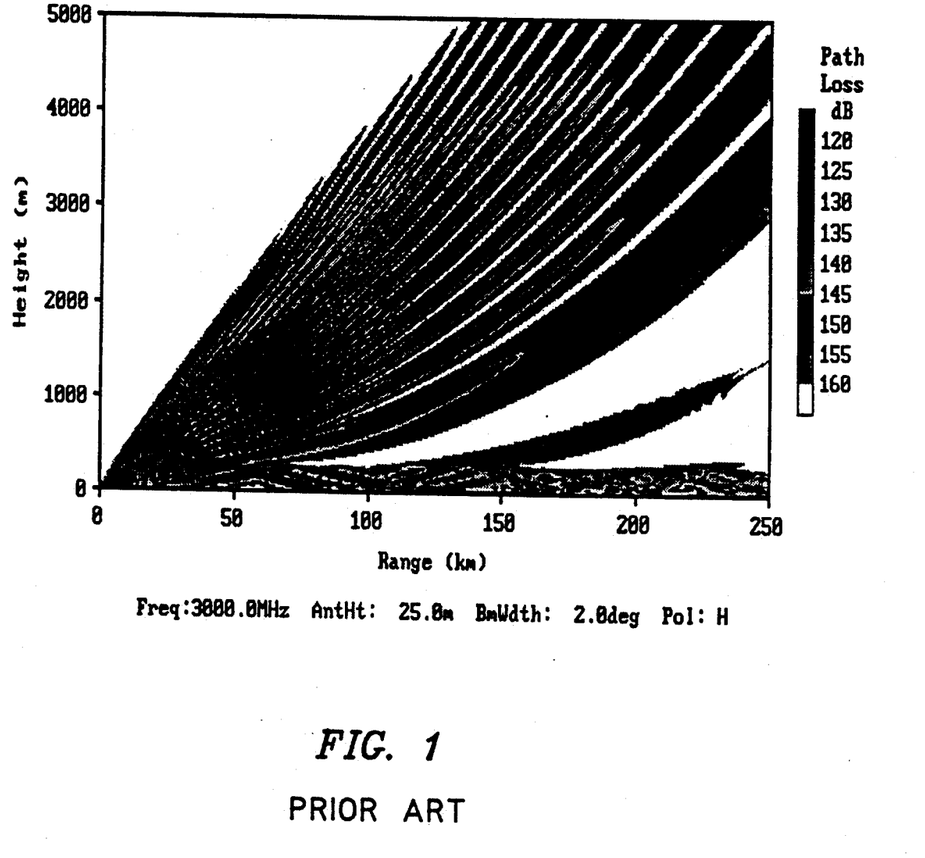
FIG. 1 is a prior art radio field strength coverage diagram of a 300-meter surface-based duct according to a Parabolic Equation method known as PCPEM.

In FIG. 1 there is shown a computer-generated radio propagation coverage diagram utilizing a commercially available Parabolic Equation method known as PCPEM. PCPEM is available through Signal Science Limited of the United Kingdom. The coverage diagram of FIG. 1 took approximately 82 minutes to construct for a 300-meter surface-based duct.

Figure 2:
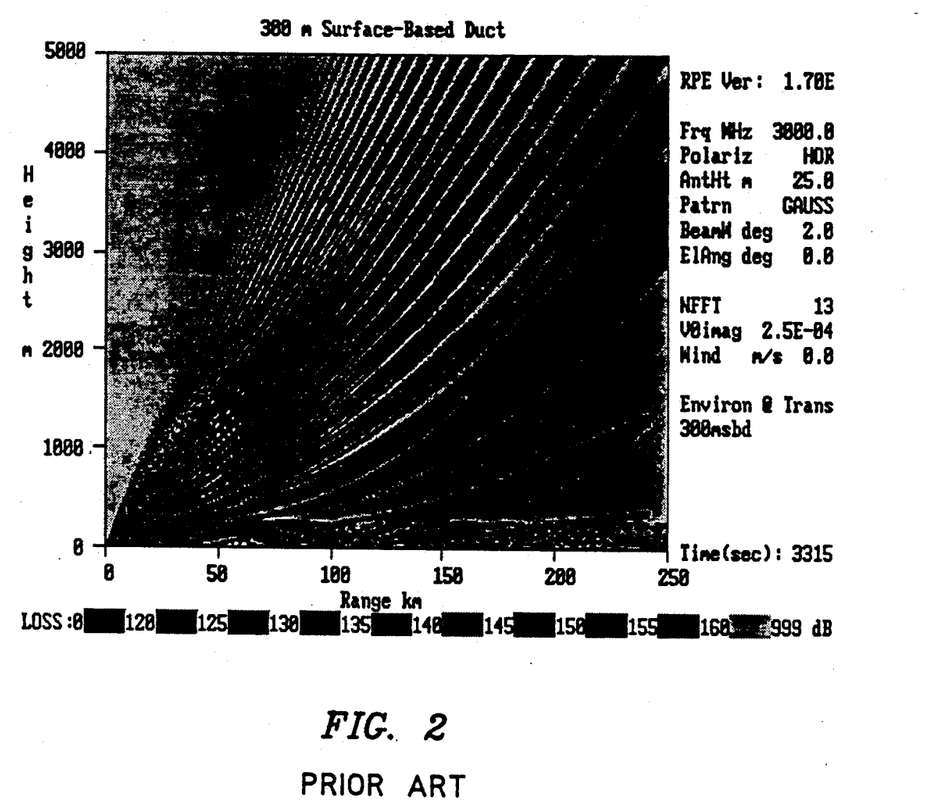
FIG. 2 is a prior art radio field strength coverage diagram of the same 300-meter surface-based duct of FIG. 2, this diagram being generated by a Parabolic Equation research method known as RPE.

In FIG. 2 another prior art Parabolic Equation technique has been used to generate a radio field strength coverage diagram for the same 300-meter surface-based duct used in FIG. 1. The program used to generate this diagram is known as RPE and is a government developed research tool written by the Naval Ocean Systems Center of San Diego, Calif. This program took 55 minutes to create the coverage diagram of the 300-meter surface-based duct shown.

In summary, Ray Optics methods provide an effective way of predicting radio-wave propagation effects, but can only be utilized within a small area of the atmosphere above a limiting ray. Parabolic Equation methods are known to be effective at nearly all ranges and altitudes; however, these methods become computationally complex as transmission frequencies increase and altitudes are raised.

For military applications, for example, there is a need for a method that quickly and effectively predicts radio propagation for great ranges and altitudes.

SUMMARY OF THE INVENTION

The invention permits radio-wave propagation to be predicted rapidly for a large area of the atmosphere for a wide variety of transmitters. This prediction is done approximately 25-100 times faster than conventional prediction methods and is achieved by substantially reducing computational requirements. This reduction in computations enables the invention to be readily used with personal computers of relatively small computer memory.

Figure 3:
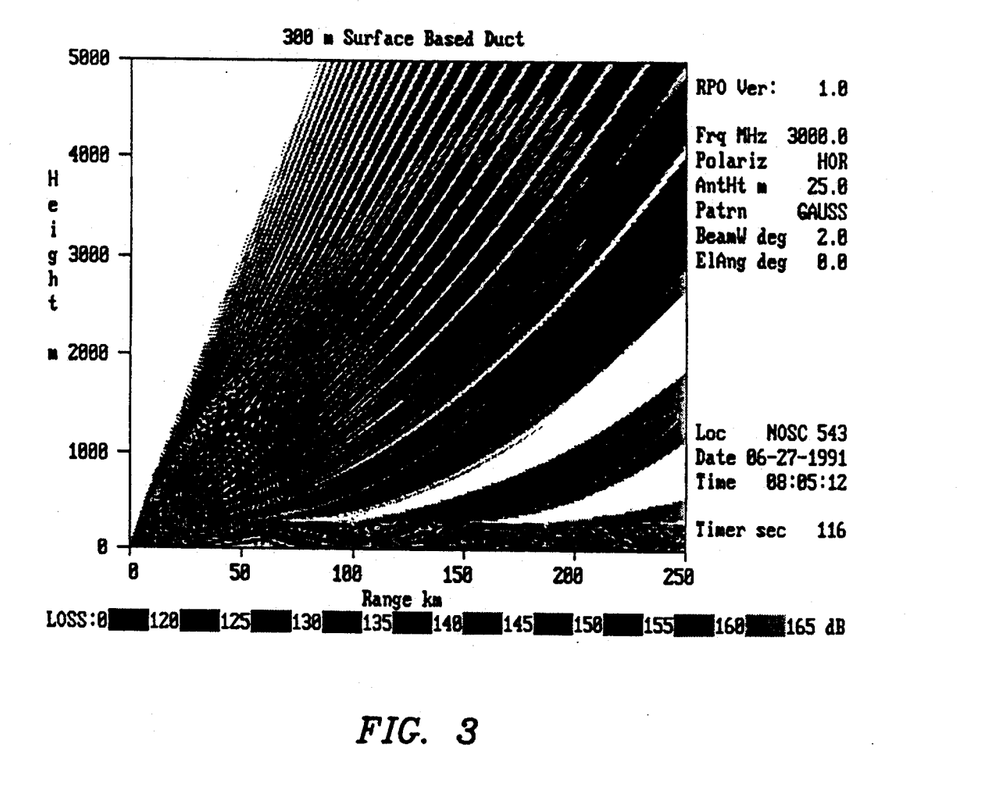
FIG. 3 is a radio field strength coverage diagram of the 300-meter surface-based duct of FIGS. 1 and 2, this diagram being generated according to the Radio Physical Optics method of the invention.

In FIG. 3 there is shown a computer generated radio propagation coverage diagram for the same 300-meter surface-based duct used for FIGS. 1 and 2. The method of the invention permitted the coverage diagram of FIG. 3 to be constructed in approximately two minutes.

The system used to construct this diagram, here named the Radio Physical Optics method, is a hybrid computational method that uses a conventional Ray Optics technique to calculate radio field strength above a limiting wave ray, a conventional Parabolic Equation technique to calculate radio field strength in an area below the limiting wave ray and below a predetermined altitude, and a newly created Extended Optics technique that combines Ray Optics and Parabolic Equation methods to calculate radio field strength below the limiting wave ray and above the predetermined altitude in an area here called the extended optics area.

In the extended optics area, a series of individual rays are traced using Snell's Law. The rays are initialized using the elevation angle at the predetermined height of rays traced through the parabolic equation area. Snell's Law is used to trace the rays through the extended optics region with the traced rays bearing a propagation factor corresponding to that present at the intersect of the traced ray and the predetermined altitude as determined through the utilized Parabolic Equation method.

From the rays traced through the extended optics region and the corresponding propagation factors calculated, the radio field strength for any point in the extended optics region can be readily determined. This can be done by interpolating the propagation factor of the point of interest and by using conventional expressions to determine either field strength or propagation loss from the propagation factor interpolated to exist at the desired point.

OBJECTS OF THE INVENTION

It is an object of the invention to provide an improved method for predicting wave field strength.

Another object of the invention is to provide an improved method for predicting radio-wave field strength that encompasses a relatively large area of the atmosphere.

Yet another object of the invention is to provide an improved method for predicting radio-wave field strength that can be performed in a relatively short period of time.

Still another object of the invention is to provide an improved method for predicting radio-wave field strength that requires minimal computer memory space.

It is still another object of the invention to provide an improved method for predicting radio-wave field strength for a large assortment of antenna patterns, including very-wide or omni-directional antenna patterns.

Other objects, advantages and new features of the invention will become apparent from the following detailed description of the invention when considered in conjunction with the accompanied drawings.

DESCRIPTION OF THE PREFERRED EMBODIMENT

Figure 4:
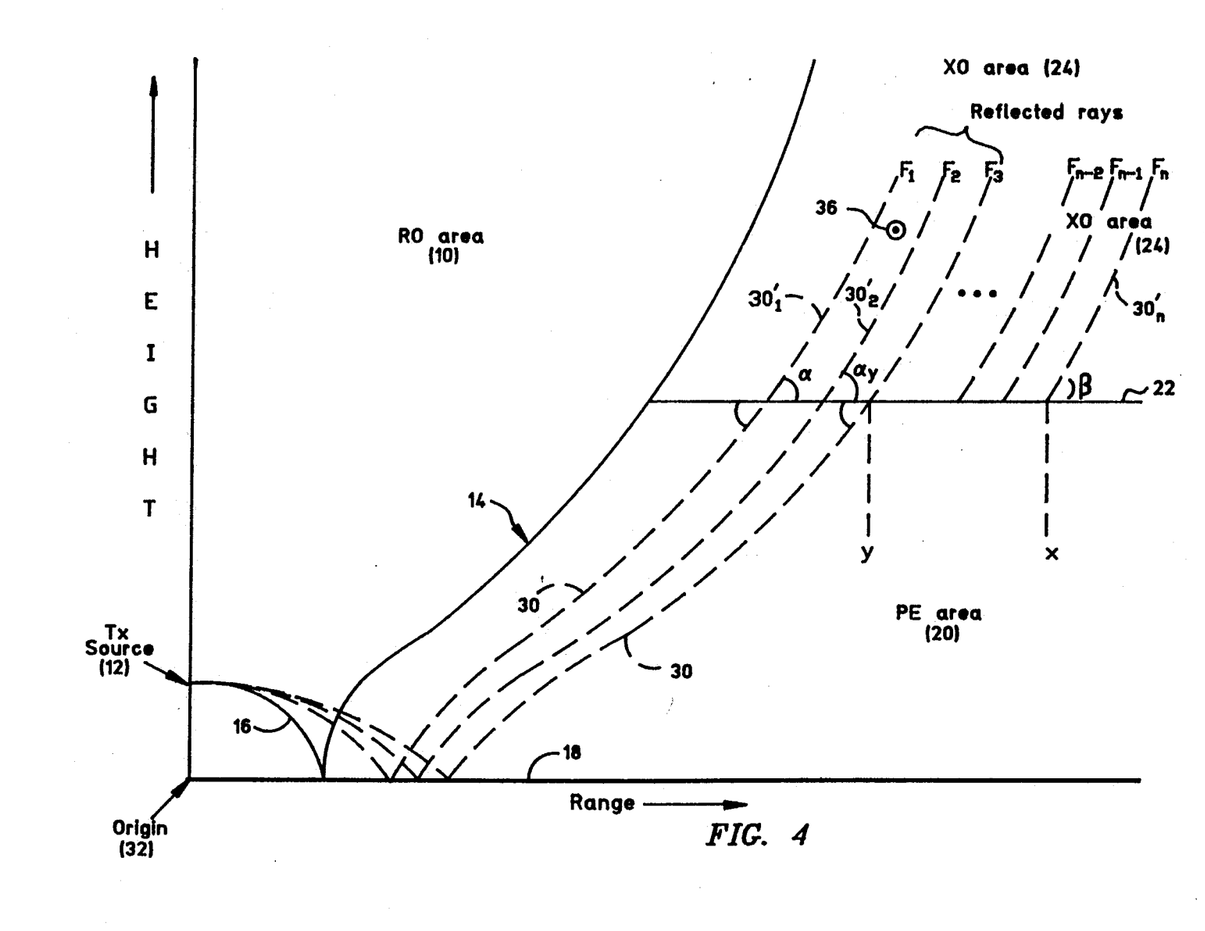
FIG. 4 illustrates how the hybrid method of the invention utilizes three methods corresponding to three distinct areas of the atmosphere.

Referring now to FIG. 4, a height versus range graph of an atmosphere of known refractive index is shown. The refractive index of the region shown can vary with height and range and is measured and calculated by methods well understood. The hybrid computational method of the invention utilizes three areas of the height versus range region shown in FIG. 4. Conventional Ray Optics techniques are used in a first area 10 originating from a transmission source 12 and extending to ranges less than and altitudes greater than a limiting radio-wave ray 14 defined by these methods. The limiting radio-wave ray is caused by a particular reflection of a transmitted radio-wave ray 16 with a reflective surface 18, here the reflective surface being shown along the abscissa of the height versus range graph.

The hybrid computational method of the invention further uses conventional Parabolic Equation techniques to calculate radio field strength in a second or lower area 20 of the plotted area of the atmosphere shown in FIG. 4. Parabolic equation area 20 exists below limiting radio-wave ray 14 and below a predetermined altitude 22. Typically, altitude 22 is 1000–2000 meters for 3000 MHz applications.

In yet a third or upper area 24 of the area of the atmosphere plotted in FIG. 4, a method here designated as Extended Optics is used. Extended optics area 24 exists below limiting radio-wave ray 14 and above predetermined altitude 22. These various methods will now be discussed in greater detail.

Figure 5:
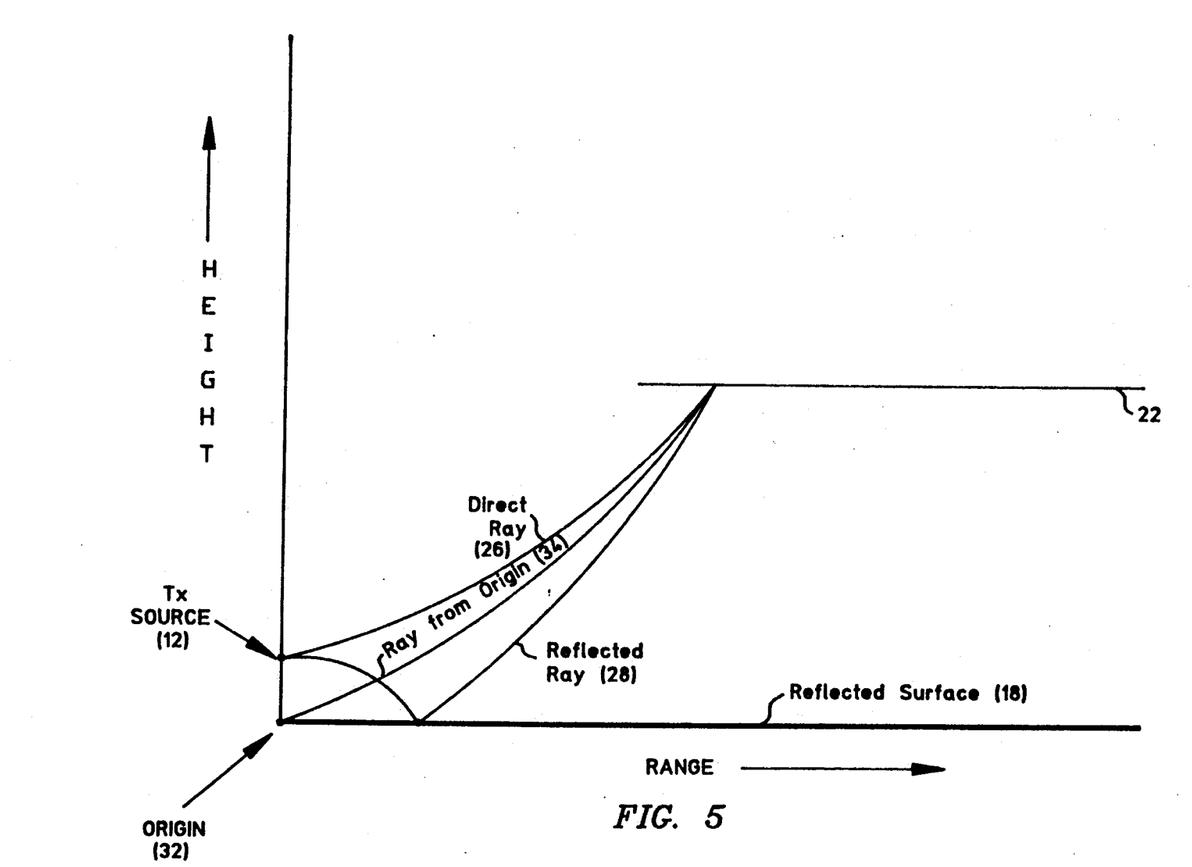
FIG. 5 illustrates rays or wave paths as may be utilized in the invention.

In ray optics area 10, direct and surface reflected rays are traced according to Snell's Law. In FIG. 5 examples of a direct ray 26 and a reflected ray 28 are shown. In conventional Ray Optics methods, the amplitude and phase of these two waves are calculated such that the coherent sum of the two waves allows accurate radio field strength to be calculated. Ray Optics techniques, such as those suitable for making these field strength calculations, are described in the Shkarofsky article listed above.

In parabolic equation area 20, normal split-step Parabolic Equations methods, such as those described in the Dockery article cited above, are used to compute radio field strength, but only for a restricted area that lies below limiting radio-wave ray 14 and below predetermined altitude 22. As discussed, Parabolic Equation methods can be used for practically all ranges and altitudes; however, the larger the area in which a Parabolic Equation method is used the more computationally complex the use of the method becomes. By applying Parabolic Equation methods to a restricted area of the atmosphere, computational and time efficiency is attained.

To obtain radio field strength within parabolic equation area 20, propagation factors, defined as the ratio of the magnitude of the field strength at any point divided by the magnitude of the field strength that would exist at the same range under free-space conditions, are determined. Specifically, propagation factors are determined at the upper region of the parabolic equation area along predetermined altitude 22.

In the extended optics area 24, individual rays are traced using Snell's Law based on ray elevation angles, to be discussed, calculated to exist at predetermined altitude area 22. Along each of the extended optics rays, the propagation factor F is held constant. These F values are calculated through the utilized Parabolic Equation method, and are those values that exist at predetermined altitude 22.

To ascertain the elevation angle used to trace rays through the third or extended optics area 24, rays 30 are first traced through ray optics area 10 and parabolic equation area 20. Rays 30 traced through extended optics area 24 are initialized by the local elevation angle $\alpha$ at predetermined altitude 22 of rays 30 traced through parabolic equation area 20.

Though rays 30 are shown as being reflected from surface 18, direct rays from transmission source 12 or mathematically derived rays from origin 32 (FIG. 5) may be used to determine the elevation angle existing at predetermined altitude 22. This is true since, for practical applications, there will be little difference between the direct, origin and reflected rays. FIG. 5 shows direct ray 26, reflected ray 28 and origin ray 34.

For points along predetermined altitude 22 for which reflected or alternate rays do not exist, the elevation angle $\alpha_y$ of the ray that does exist at the furthest range (y), here called the optical limit, is used. In other words, the elevation angle used to trace rays in the extended optics area at ranges beyond the optical limit (y) is locked to the ray elevation angle traced at the furthest range of those rays traced through parabolic equation area 20.

If it is known that the refractive index varies along predetermined altitude 22, then the elevation angle used to trace rays in extended optics area 24 must be adjusted. This adjustment is according to the relation $$\beta^2 = \alpha_y^2 + 0.000002 \cdot [M(x) - M(y)]$$

where $\beta$ is the elevation angle used to initiate ray tracing at a range x, $\alpha_y$ is the elevation angle at the optical limit range y, and M(x) and M(y) are modified refractivity values calculated for the ranges x and y, respectively, along predetermined altitude 22. ($\alpha$ and $\beta$ are in radians).

Modified refractivity is defined as $$M = [n - 1 + z/a] \cdot 10^6$$

where n is the refractive index, z is the altitude above the earth's surface, and a is the earth's radius.

After rays 30' are traced in extended optics area 24 the following technique may be used to compute the total radio field strength at any range and altitude point in the extended optics area. First, two rays traced on either side of a point of interest are located. In FIG. 4 point 36 exists between rays $30'_1$ and $30'_2$. Then, linear interpolation may be used to calculate the propagation factor F value in decibels at point 36 based on the propagation factor F values in decibels, $F_1$ and $F_2$, assigned to rays $30_1'$ and $30_2'$, respectively. These values are derived from the parabolic equation calculations performed at predetermined altitude 22. Once the propagation factor F in decibels is known at point 36, then either radio field strength or propagation loss in decibels can be readily determined using conventional mathematical expressions.

The combination of Ray Optics, Parabolic Equation and Extended Optics methods allows computation of radio propagation effects at all heights and ranges from a transmitter. The primary advantage of this technique is speed of operation. It has proven to be 25 to 100 times faster than traditional split-step Parabolic Equation methods. In addition, it is known that for some cases the accuracy of the hybrid Radio Physical Optics method described here has been better than use of the Parabolic Equation method alone. Other advantages of the Radio Physical Optics method are decreased computer memory requirements and the ability to accommodate wider antenna patterns than those which Parabolic Equation methods can handle. For example, for very wide or omni-directional antenna patterns, there is no other known method that will compute radio propagation effects at all ranges and altitudes as does the method of the invention.

Obviously, many modifications and variations of the invention are possible in light of the above teachings. It is therefore to be understood that within the scope of the amended claims the invention may be practiced otherwise than as has been specifically described.

What is claimed is:

1. A computer implemented method for predicting wave intensity of a wave transmission through an upper area of a medium that is above a predetermined height, said medium being of known refractive index, said method comprising the steps of:

tracing wave rays through a lower area of said medium that is below said predetermined height;

calculating propagation factors present at said predetermined height;

tracing wave rays through said upper area of said medium using initial ray angles that
   (1) equal the elevation angles at said predetermined height of said wave rays traced through said lower area of said medium, and,
   (2) for ranges where no such elevation angles exist, equal the elevation angle at said predetermined height of the wave ray that is traced at the furthest (optical limit) range of those rays traced through said lower area of said medium;

selecting a point in said upper area of said medium at which a prediction of said wave intensity is desired;

locating two of said wave rays traced through said upper area of said medium on substantially opposite sides of said point;

matching each of said two rays traced through said upper area of said medium with a corresponding propagation factor calculated to be present at said predetermined height;

calculating the propagation factor of said point by interpolating between the propagation factors corresponding to said two wave rays traced through said upper area of said medium; and determining mathematically the wave propagation at said point from said propagation factor calculated for said point.

2. A method according to claim 1 in which said wave transmission is a radio-wave transmission and in which said medium is the earth's atmosphere.

3. A method according to claim 1 in which said wave rays traced through said lower area of said medium represent waves reflected from a reflective surface.

4. A method according to claim 1 in which said wave rays traced through said lower area of said medium represent waves emanating directly from a transmission source.

5. A method according to claim 1 in which said wave rays traced through said lower area of said medium represent waves mathematically constructed to originate at a reflective surface lying directly below a transmission source.

6. A computer implemented method for predicting wave intensity of a wave transmission through a medium of known refractive index, said medium bordering a reflective surface, said method comprising the steps of:
   (a) using a ray-optics method to predict wave intensity in a first area of said medium originating from a source of wave transmission and extending to ranges less than, and altitudes greater than, a limiting wave ray caused by the reflection of a transmitted wave with said reflective surface;
   (b) using a parabolic-equation method to predict wave intensity in a second area of said medium below said limiting wave ray and below a predetermined height;
   (c) tracing wave rays through said first and second areas of said medium;
   (d) using an extended-optics method to predict wave intensity in a third area of said medium below said limiting wave ray and above said predetermined height, said extended optics method including
      (1) tracing wave rays through said third area of said medium using initial ray angles that
         (a) equal the elevation angles at said predetermined height of said wave rays traced through said second area of said medium, and
         (b), for ranges where no such elevation angles exist, equal the elevation angle at said predetermined height of the wave ray that is traced at the furthest (optical limit) range of those rays traced through said second area of said medium;
      (2) selecting a point in said third area of said medium at which a prediction of said wave intensity is desired;
      (3) locating two of said wave rays traced through said third area of said medium on substantially opposite sides of said point;
      (4) matching each of said two rays traced through said third area of said medium with a corresponding propagation factor present at said predetermined height, said propagation factor being calculated through said parabolic-equation method;
      (5) calculating the propagation factor of said point by interpolating between the propagation factors corresponding to said two wave rays traced through said third area of said medium; and
      (6) determining mathematically the wave intensity at said point from said propagation factor calculated for said point.

7. A method according to claim 6 in which said wave transmission is a radio-wave transmission and in which said medium is the earth's atmosphere.

8. A method according to claim 6 in which said wave rays traced through said second area of said medium represent waves reflected from said reflective surface.

9. A method according to claim 6 in which said wave rays traced through said second area of said medium represent waves emanating directly from said source of wave transmission.

10. A method according to claim 6 in which said wave rays traced through said second area of said medium represent waves mathematically constructed to originate at a reflective surface lying directly below a transmission source.

11. A computer implemented method for predicting radio field strength from a radio transmission through an atmosphere of known radio refractive index, said atmosphere bordering a reflective surface, said method comprising the steps of:
   (a) using a ray-optics method to predict radio field strength in a first area of said atmosphere originating from a source of radio transmission and extending to ranges less than, and altitudes greater than, a limiting radio-wave ray caused by the reflection of a transmitted radio-wave with said reflective surface;
   (b) using a parabolic-equation method to predict radio field strength in a second area of said atmosphere below said limiting ray and below a predetermined altitude;
   (c) tracing radio-wave rays through said first and second areas of said atmosphere;
   (d) using an extended-optics method to predict radio field strength in a third area of said atmosphere below said limiting ray and above said predetermined altitude, said extended optics method including
      (1) tracing radio-wave rays through said third area of said atmosphere using initial ray elevation angles that
         (a) equal the elevation angles at said predetermined altitude of said radio-wave rays traced through said second area of said atmosphere, and
         (b), for ranges where no such elevation angles exist, equal the elevation angle at said predetermined altitude of the radio-wave ray that is traced at the furthest (optical limit) range of those rays traced through said second area of said atmosphere;
      (2) selecting a point in said third area of said atmosphere at which a prediction of said radio field strength is desired;
      (3) locating two of said rays traced through said third area of said atmosphere on substantially opposite sides of said point;
      (4) matching each of said two rays traced through said third area of said atmosphere with a corresponding propagation factor present at said predetermined altitude, said propagation factor being calculated through said parabolic-equation method;
      (5) calculating the propagation factor of said point by interpolating between the propagation factors corresponding to said two rays traced through said third area of said atmosphere; and (6) determining mathematically the radio field strength at said point from said propagation factor calculated for said point.

12. The method of claim 11 in which said refractive index beyond said optical limit varies along said predetermined altitude, said method further including the step of adjusting said initial ray angles used for tracing radio-wave rays beyond said optical limit, said adjusting being in accordance with the relation $$\beta^2 = \alpha^2 + 0.000002 * \{M(x) - M(y)\}$$

where $\beta$ is the adjusted ray elevation angle (in radians) at a desired range (x), $\alpha$ is said elevation angle (in radians) at said predetermined altitude of said ray at the furthest (optical limit) range (y) at which said radio-wave rays are traced through said second area of said atmosphere, M(x) and M(y) are modified refractivity values calculated for the ranges (x) and (y) at said predetermined altitude, in which modified refractivity is defined by the relation $$M = \{n - 1 + z/a\} * 10^6$$

where (n) is the known radio refractive index, (z) is the height above the earth's surface and (a) is the earth's radius.

13. A method according to claim 11 in which said radio-wave rays traced through said second area of said atmosphere represent radio-waves reflected from a reflective surface.

14. A method according to claim 11 in which said radio-wave rays traced through said second area of said atmosphere represent radio-waves emanating directly from said source of radio transmission.

15. A method according to claim 11 in which said radio-wave rays traced through said second area of said medium represent radio-waves mathematically constructed to originate at a reflective surface lying directly below a transmission source.

* * * * *